US007953143B2

(12) United States Patent
Mahadevan et al.

(10) Patent No.: US 7,953,143 B2
(45) Date of Patent: May 31, 2011

(54) SYSTEMS AND METHODS FOR DERIVING PARAMETERS FOR IMPULSE NOISE DETECTORS

(75) Inventors: Amitkumar Mahadevan, Eatontown, NJ (US); Patrick Duvaut, Tinton Falls, NJ (US); Julien D. Pons, Carteret, NJ (US)

(73) Assignee: Ikanos Communications, Inc., Fremont, CA (US)

( * ) Notice: Subject to any disclaimer, the term of this patent is extended or adjusted under 35 U.S.C. 154(b) by 646 days.

(21) Appl. No.: 12/036,035

(22) Filed: Feb. 22, 2008

(65) Prior Publication Data
US 2009/0216489 A1     Aug. 27, 2009

(51) Int. Cl.
*H04B 1/38* (2006.01)
*H04K 1/10* (2006.01)
(52) U.S. Cl. ........................ 375/222; 375/260
(58) Field of Classification Search .............. 375/222, 375/224, 226, 227, 260, 346
See application file for complete search history.

(56) References Cited

U.S. PATENT DOCUMENTS

| | | | | |
|---|---|---|---|---|
| 6,075,821 | A * | 6/2000 | Kao et al. ................... | 375/260 |
| 6,834,109 | B1 * | 12/2004 | Pare, Jr. et al. ............. | 379/416 |
| 7,558,337 | B2 * | 7/2009 | Ma et al. ..................... | 375/316 |
| 2007/0183526 | A1 | 8/2007 | Norrell et al. | |
| 2008/0298444 | A1 * | 12/2008 | Cioffi et al. ................ | 375/222 |
| 2009/0052594 | A1 * | 2/2009 | Li et al. ...................... | 375/341 |

OTHER PUBLICATIONS

Sliskovic, M., "Impulse Noise Detection Algorithms for Multicarrier Communication Systems—Performance Analysis," Proceedings of the 2nd International Symposium on Image and Signal Processing and Analysis, 2001, ISPA 2001, Jun. 19-21, 2001, pp. 496-501, Pula.
Sliskovic, M., "Signal processing algorithm for OFDM channel with impulse noise," Proceedings of the 7th IEEE International Conference on Electronics, Circuits and Systems, 2000, ICECS 2000, Dec. 17-20, 2000, pp. 222-225, Junieh.
Toumpakaris, D., Yu, W., Cioffi, J. M., Gardan, D. and Ouzzif, M., "A Byte-Erasure Method for Improved Impulse Immunity in DSL Systems using Soft Information from an Inner Code," Proceedings of the IEEE International Conference on Communications, ICC 2003, May 2003 vol. 4, pp. 2431-2435, Anchorage, AK.
Toumpakaris, D., Yu, W., Cioffi, J. M., Gardan, D. and Ouzzif, M., "A Simple Byte-Erasure Method for Improved Impulse Immunity in DSL," Proceedings of the IEEE International Conference on Communications, 2003, ICC 2003, May 2003 vol. 4, pp. 2426-2430, Anchorage, AK.

(Continued)

*Primary Examiner* — Don N Vo
(74) *Attorney, Agent, or Firm* — Thomas, Kayden, Horstemeyer & Risley, LLP

(57) ABSTRACT

A system is described that comprises a frequency domain impulse noise detector configured to monitor received discrete multi-tone (DMT) symbols for impulse noise, a Reed Solomon (RS) decoder with erasure and erasure correction capability for performing error correction on received DMT symbols, and an optimization module configured to adjust parameters associated with the impulse noise detector, the optimization module configured to adjust values for $\beta_{pivot}$, $\beta_c$, and a ratio (m/M), wherein M is a number of monitored tones, m is a number of slicer error samples that must exceed a decision threshold for a symbol to be flagged as corrupted, and $\beta_{pivot}$ and $\beta_c$ are values associated with a monotonic function of a ratio of a statistical parameter of disruptive noise to a statistical parameter of nominal noise.

34 Claims, 5 Drawing Sheets

OTHER PUBLICATIONS

Toumpakaris, D., Cioffi, J. M., Gardan, D. and Ouzzif, M., "A Square Distance-Based Byte-Erasure Method for Reduced-delay Protection of DSL Systems from Non-stationary Interference," Proceedings of the IEEE Global Telecommunications Conference, 2003, Globecom 2003, Dec. 1-5, 2003, vol. 4, pp. 2114-2119.

Yu, W., Toumpakaris, D., Cioffi, J. M., Gardan, D. and Gauthier, F., "Performance of Asymmetric Digital Subscriber Lines in an Impulse Noise Environment", IEEE Transactions on Communications, vol. 51, Issue: 10, pp. 1653-1657, Oct. 2003.

Armstrong, J. and Suraweera, H. A., "Impulse Noise Mitigation for OFDM Using Decision Directed Noise Estimation", Proceedings of the Eighth IEEE International Symposium on Spread Spectrum Techniques and Applications, 2004, ISSSTA 2004, Aug. 30-Sep. 2, 2004, pp. 174-178, Sydney, Australia.

Zhang, L. and Yongacoglu, A., "Turbo Decoding with Erasures for High-speed Transmission in the Presence of Impulse Noise", 2002 Zurich International Seminar on Broadband Communications, Feb. 19-21, 2002, Zurich, Switzerland.

G.993.2, VDSL2 standard, Feb. 2006.

Kirkby, Rob, "BTexaCT, Text for Realistic Impulsive Noise Model", ETSI TM6 meeting Feb. 12-16, 2001, Sophia Antipolis.

Hirakawa, T., Itami, M., and Itoh, K., "An Iterative Scheme to Reduce Influence of Impulse Noise in OFDM Transmission", 2007.

* cited by examiner

SYSTEMS AND METHODS FOR DERIVING PARAMETERS FOR IMPULSE NOISE DETECTORS

TECHNICAL FIELD

The present disclosure generally relates to communications and more particularly relates to deriving parameters for impulse noise detectors.

BACKGROUND

The presence of impulse noise can occur in digital subscriber line (xDSL) systems due to electromagnetic interference from such sources as a telephone network, power system, and even from natural phenomena such as thunderstorms and lightning. The effects of impulse noise significantly limit the reliability of real-time services, such as video that can be supported by current generation xDSL systems, for example, VDSL (Very High Speed DSL). As a result, there is significant need for the development and standardization of techniques for detecting and mitigating the effects of impulse noise.

The detection of impulse noise may be performed in the time domain, frequency domain, or even jointly in the time-frequency domain. For instance, various techniques are used to detect impulse noise in OFDM (Orthogonal Frequency-Division Multiplexing) systems. These techniques include signal power based time domain and frequency domain detection, as well as frequency domain detection based on mean-squared error monitoring. Other techniques include utilizing a joint time-frequency impulse noise detector based on signal power computations performed in both domains. Other impulse noise detectors are directed to monitoring the metric used in the decoding of the inner code, while a related technique is based on comparing the hard-decision and soft-decision output of a convolutional coded modulation scheme. Other techniques involve detecting RS (Reed Solomon) codeword symbols corrupted by impulse noise and providing protection against impulse noise using RS decoding with erasure correction.

Within xDSL systems, DMT symbol-based impulse noise detectors are generally utilized to monitor DMT symbols that are corrupted by impulse noise so that statistics related to the occurrence of impulse noise events (such as inter-arrival time) can be tracked. In addition, detection of impulse noise can be utilized to trigger impulse noise mitigation schemes such as RS (Reed Solomon) decoding with erasures, blanking, or retransmission. One approach to detecting the presence of impulse noise in a DMT symbol is based on monitoring the post-FEQ (frequency domain equalizer) slicer error for a set of M tones (that are not necessarily contiguous) and comparing them with tone-dependent thresholds.

However, one perceived shortcoming with such detectors is that key design parameters are not tuned or optimized in order to meet diverse performance requirements, which include the following: (1) achieving an average BER (bit error rate) at the output of Reed Solomon decoders with erasure correction which aligns with industry requirements (i.e., a BER of $10^{-7}$ for such services as ADSL and VDSL) despite the occurrence of misdetections at the output of the impulse noise detector; (2) seamless integration of the impulse noise detector with such existing transceiver features as maintaining a certain noise margin and seamless rate adaptation (SRA) mechanisms; and (3) minimizing the complexity of the impulse noise detector. Therefore, a heretofore unaddressed need exists in the industry to address the aforementioned deficiencies and inadequacies.

SUMMARY

Briefly described, one embodiment, among others, is a method for deriving a set of parameters associated with a frequency domain impulse noise detector. In accordance with such embodiments, the method comprises setting values for $\beta_{pivot}$ and $\beta_c$, wherein $\beta_{pivot}$ and $\beta_c$ are values associated with a monotonic function of a ratio of a statistical parameter of disruptive noise to a statistical parameter of nominal noise. The method further comprises selecting a fixed ratio (m/M), wherein M is a number of monitored tones, and wherein m is a number of slicer error samples that must exceed a decision threshold for a symbol to be flagged as corrupted. The method also comprises selecting a plurality of values for M and computing a corresponding value of m based on the fixed ratio (m/M), calculating a based on the values of M, m, and $\beta_{pivot}$, wherein α is a tunable scaling factor, and calculating a probability of a miss and a probability of a false alarm based on the values of M, m, $\beta_c$, and α for each of the plurality of values of M. In accordance with some embodiments, the method further comprises selecting from among the plurality of values for M such that the larger of the probability of a miss and the probability of a false alarm is a predetermined scale factor less than a predetermined bit error rate (BER) at a selected value of $\beta_c$ in order to achieve the predetermined BER.

Another embodiment is a system that comprises a frequency domain impulse noise detector configured to monitor received discrete multi-tone (DMT) symbols for impulse noise, a Reed Solomon (RS) decoder with erasure and erasure correction capability for performing error correction on received DMT symbols, and an optimization module configured to adjust parameters associated with the impulse noise detector. The optimization module is configured to adjust values for $\beta_{pivot}$, $\beta_c$, and a ratio (m/M), wherein M is a number of monitored tones, m is a number of slicer error samples that must exceed a decision threshold for a symbol to be flagged as corrupted, and $\beta_{pivot}$ and $\beta_c$ are values associated with a monotonic function of a ratio of a statistical parameter of disruptive noise to a statistical parameter of nominal noise.

Another embodiment is a method that comprises setting values for $\beta_{pivot}$, $\beta_c$, and a ratio (m/M), wherein M is a number of monitored tones, m is a number of slicer error samples that must exceed a decision threshold for a symbol to be flagged as corrupted, and $\beta_{pivot}$ and $\beta_c$ are values associated with a monotonic function of a ratio of a statistical parameter of disruptive noise to a statistical parameter of nominal noise. The method further comprises selecting a plurality of values for M and computing a corresponding value of m based on the ratio (m/M), calculating α based on the values of M, m, and $\beta_{pivot}$, wherein α is a tunable scaling factor, calculating a probability of a miss and a probability of a false alarm based on the values of M, m, and α for each value of M, and adjusting the value of M such that the larger of the probability of a miss and the probability of a false alarm is a predetermined scale factor less than a predetermined bit error rate (BER) at and above a selected value of $\beta_c$ in order to achieve the predetermined BER.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
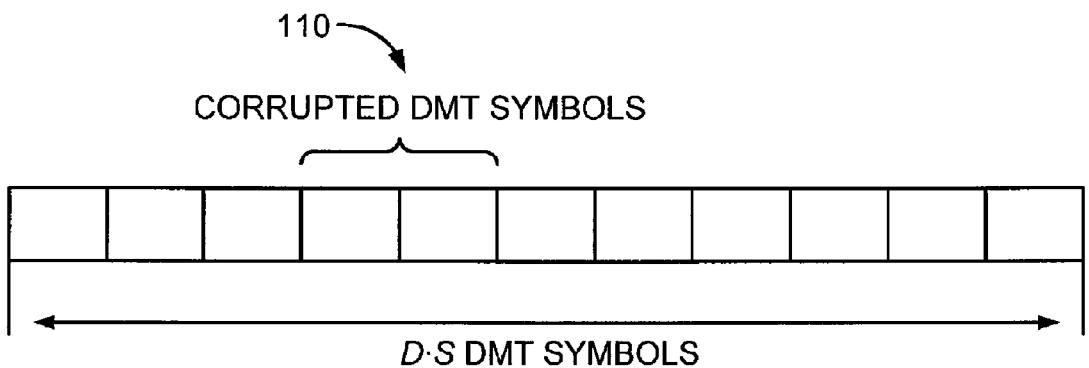
FIG. 1A is a system model for illustrating the impact of false alarms and miss events that occur at the output of an impulse noise detector.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As discussed in the background section, certain impulse noise detectors operate by monitoring the post-FEQ (frequency domain equalizer) slicer error on a set of M tones (that are not necessarily contiguous) and comparing them with tone-dependent thresholds. For purposes of nomenclature, such detectors will be referred to as tone error-based frequency domain impulse noise (or TEIN) detectors. One apparent shortcoming with TEIN detectors is that key design parameters are not tuned or optimized in order to meet diverse yet important performance requirements. Such requirements include the following: (1) achieving an average BER (bit error rate) at the output of Reed Solomon decoders with erasure correction which aligns with industry requirements (i.e., a BER of $10^{-7}$ for such services as ADSL and VDSL) despite the occurrence of mis-detections at the output of the impulse noise detector; (2) seamless integration of the impulse noise detector with such existing transceiver features as maintaining a certain noise margin and seamless rate adaptation (SRA) mechanisms; and (3) minimizing the complexity of the TEIN detector. The present invention provides a mechanism to quickly and reliably derive parameters for TEIN detectors while both providing optimal performance at the system level and minimizing the complexity of the impulse noise detector.

First, the general framework for frequency domain impulse noise detection based on monitoring the residual error on several sub-carriers is described. The impulse noise detection issue within the frequency domain is discussed in the context of classical binary hypothesis testing and a decision rule in accordance with exemplary embodiments is described. Next, probability theory based analysis of the frequency domain impulse noise detectors is discussed. Analytical expressions for the probability of the residual error exceeding the detection threshold for a single tone are derived for two scenarios—misses and false alarms. An impulse noise event is usually characterized by a sequence of DMT symbols being corrupted by noise that is significantly stronger than what is considered "nominal noise" or typical background noise within a system. A miss event occurs when a DMT symbol is affected by impulse noise but yet is flagged as a nominal DMT symbol. A false alarm occurs when a nominal DMT symbol is flagged as an impulse noise DMT symbol. The probability expressions are used to evaluate the performance characteristics of the impulse detector. From there, use of RS decoding with erasure correction in VDSL systems with impulse noise detection are then described. Finally, exemplary embodiments of a design process for adjusting the parameters of impulse noise detectors based on key design requirements are described.

Tone Error-Based Frequency Domain Impulse Noise Detectors

The tone error-based frequency domain impulse noise (TEIN) detector described herein is based on monitoring of the slicer error for a set of M tones (that are not necessarily contiguous) at the scale of the odd-integer grid and comparing them with tone-dependent thresholds. Generally, frequency domain based detection of impulse detection is performed as follows. A DMT symbol is flagged as corrupted by impulse noise if the instantaneous absolute value of the slicer error on any m or more of the M tones exceeds a predetermined threshold. Otherwise, the DMT symbol is flagged as a "nominal" DMT symbol. For a $k^{th}$ tone within a set of M tones, the threshold against which the absolute value of the instantaneous slicer error is compared is defined according to the equation below:

$$\tau_k = \alpha_k \sigma_k \quad \text{Equation 1}$$

where $\sigma_k$ is the component-wise standard deviation of the nominal noise on tone k, and $\alpha_k > 0$ is a tunable factor.

It is assumed that noise figures ($\sigma_k$) for the monitored tones are readily known. Generally, this is a reasonable assumption as VDSL modems typically closely monitor the signal-to-noise ratio (SNR) associated with all DMT tones. It should be noted that a useful estimation of the threshold requires that samples corrupted by impulse noise be discarded as these samples can significantly bias the estimate. If the complex residual error at the output of the slicer for the $k^{th}$ tone at the scale of the odd-integer grid, $x_k$ is accumulated over N DMT symbols (which are not corrupted by impulse noise), then the component-wise standard deviation of the nominal noise on tone k can be computed as:

$$\sigma_k = \sqrt{\frac{1}{2N} \sum_{n=1}^{N} |w_k[n]|^2} \quad \text{Equation 2}$$

where n serves as an index for the DMT symbols that are considered in the evaluation of $\sigma_k$.

Next, suppose the expression $x_k = x_{k,r} + i x_{k,i}$ represents the complex instantaneous slicer-error on tone k for a given DMT symbol at the scale of the odd-integer grid. The probabilities of exceeding the detector threshold $\tau_k$ under both "nominal" and "disruptive" (impulse noise) conditions are derived based on the assumption that $x_k$ is circular Gaussian. Generally, as the slicer always demaps the received symbol to the nearest constellation point on an odd-integer grid, the slicer-error does not have infinite support and is therefore not Gaussian in nature. However, if the constellation edge-effect is ignored (or equivalently, if an infinite 2-dimensional odd-integer grid constellation defined by points $\pm(2n+1)\pm j(2m+1)$, n, m$\in$Z is considered), then the support for the slicer-error is defined by the square region given by ($\pm 1 \pm j$). It should be noted that the non-Gaussian behavior of the distribution of $x_k$ is accentuated when the DMT symbol is corrupted by impulse noise.

Under nominal noise conditions (represented as Hypothesis $\mathcal{H}_0$) the value of $x_k$ has component-wise standard deviation equal to $\sigma_k$. As such, the probability of exceeding the threshold $\tau_k$ is expressed as:

$$p_{0,k} = Pr\left\{|x_k| = \sqrt{x_{k,r}^2 + x_{k,i}^2} > \alpha_k \sigma_k \,\Big|\, \mathcal{H}_0\right\} = e^{-\alpha_k^2/2} \qquad \text{Equation 3}$$

Next, under "disruptive" or "impulse noise" conditions (represented as Hypothesis $\mathcal{H}$), the component-wise standard deviation is expressed as:

$$\theta_k = \beta_k \sigma_k, \beta_k > 1 \qquad \text{Equation 4}$$

Thus, under disruptive noise conditions (i.e., where $\beta_k > 1$), the probability of exceeding the threshold $\tau_k$ is expressed as:

$$Pr\{|x_k| > \tau_k\} = 1 - Pr\left\{r_k \in \bigcup_{j=0}^{J-1} R^j\right\} = 1 - \sum_{j=0}^{J-1} Pr\{r_k \in R^j\} \qquad \text{Equation 5}$$

where J denotes the total number of constellation points in the considered QAM constellation, and $R^j$ represents the circular region of radius $\tau_k = \alpha_k \sigma_k$ around the $j^{th}$ constellation point.

Probability of False Alarm ($P_{FA}$) and Probability of Miss ($P_M$)

The analytic framework discussed above for $Pr\{|x_k| > \tau_k | \mathcal{H}_0\}$ and $Pr\{|x_k| \leq \tau_k | \mathcal{H}\}$ for individual tones can be utilized to compute the probability of false alarms and the probability of misses by the impulse noise detector described earlier. Before proceeding, some basic assumptions are discussed. First, it is assumed that the values for $\alpha_k$ (tunable parameters for the impulse noise detector) are identical for all monitored tones—that is, the following relationship holds true:

$$\alpha_k = \alpha_l = \alpha, k, l \in \{1, \ldots, M\} \qquad \text{Equation 6}$$

Also, the threshold $\tau_k$ for each of the different tones can be assumed to be approximately the same as the nominal noise standard deviations ($\sigma_k$) are almost the same across all the tones at the scale of the odd-integer grid. As such, the following holds true:

$$p_k = Pr\{|x_k| > \tau_k = \alpha \sigma_k | \mathcal{H}_0\} = p, k \in \{1, \ldots, M\} \qquad \text{Equation 7}$$

Next, it is assumed that the values for $\beta_k$ (the level by which the impulse noise exceeds the nominal noise at the scale of the odd-integer grid) are the same across all monitored tones such that:

$$\beta_k = \beta_l = \beta, k, l \in \{1, \ldots, M\} \qquad \text{Equation 8}$$

It should be noted that the assumption above will generally not hold true when the impulse noise is colored. However, if the set of monitored bins occupies a narrow band and if the impulse noise power spectral density does not vary significantly over this band, this assumption is justified. Thus, the following expression holds true:

$$q_k = Pr\left\{|x_k| > \tau_k = \alpha \sigma_k = \frac{\alpha}{\beta}\theta_k \,\Big|\, \mathcal{H}_1\right\} = q, k \in \{1, \ldots, M\} \qquad \text{Equation 9}$$

Finally, the following expressions for the probability of false alarms ($P_{FA}$) and the probability of misses ($P_M$) can be derived from the equations above:

$$P_{FA}(\alpha) = Pr\{\mathcal{H}_1 | \mathcal{H}_0\} = \sum_{i=m}^{M} \binom{M}{i} p^i (1-p)^{M-i} \qquad \text{Equation 10}$$

$$P_M(\alpha, \beta) = Pr\{\mathcal{H}_0 | \mathcal{H}_1\} = \sum_{i=0}^{m-1} \binom{M}{i} q^i (1-q)^{M-i} \qquad \text{Equation 11}$$

From these equations, it should be noted that $P_{FA}$ is a function of only $\alpha$ and is independent of $\beta$, whereas $P_M$ depends on both $\alpha$ and $\beta$.

Impulse Noise Detection and RS Decoding with Erasures

As the expressions for $P_{FA}$ and $P_M$ have been derived, the use of Reed Solomon (RS) erasure decoding in an impulse noise environment is now described. As discussed earlier, one apparent shortcoming with TEIN detectors is that key design parameters are not tuned or optimized in order to meet diverse performance requirements. Such requirements include: (1) achieving an average BER (bit error rate) at the output of RS decoders with erasure correction which aligns with industry requirements (i.e., a BER of $10^{-7}$ for such services as ADSL and VDSL) despite the occurrence of misdetections at the output of the impulse noise detector; (2) seamless integration of the impulse noise detector with such existing transceiver features as maintaining a certain noise margin and seamless rate adaptation (SRA) mechanisms; and (3) minimizing the complexity of the TEIN detector. The present invention provides a mechanism to quickly and reliably derive parameters for TEIN detectors while both providing optimal performance at the system level and minimizing the complexity of the impulse noise detector.

First, consider an error correcting code (N, k, $d_{min}$) where N is the number of codeword symbols, k is the number of information symbols, and $d_{min}$ is the minimum distance of the code. As known by those skilled in the art, decoding a code using an algorithm that utilizes information on the location of severely corrupted received codeword symbols (i.e., received codeword symbols that are tagged as erasures) can provide improved error correcting performance when compared to that obtained by an algorithm that does not exploit erasures.

Reed Solomon codes with symbols based on $GF(2^8)$ with $N \leq 255$ symbols and $d_{min} = N - k + 1$ have been standardized for use in multicarrier communications systems such as ADSL and VDSL systems. For such codes, practical decoding algorithms exist that can correct up to e symbols in error in a codeword as long as $2e < d_{min}$. If information on erasures is also exploited, it is possible to correct a combination of e errors and f erasures as long as $2e + f < d_{min}$. As such, those skilled in the art will appreciate that if corrupted RS codeword symbols are identified, twice as many corrupted symbols can be corrected when compared to the absence of such information.

Figure 1B:
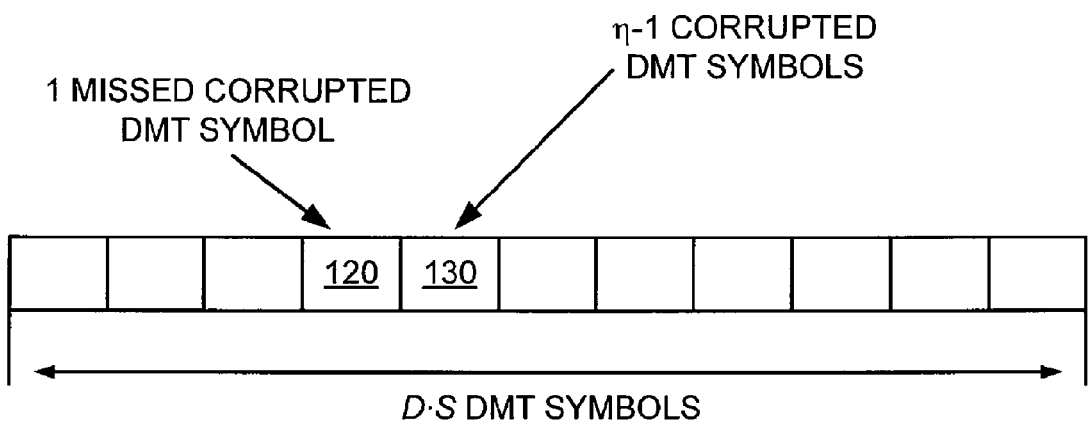
FIG. 1B illustrates the impact of a single miss event in the system model depicted in FIG. 1A.
Figure 1C:
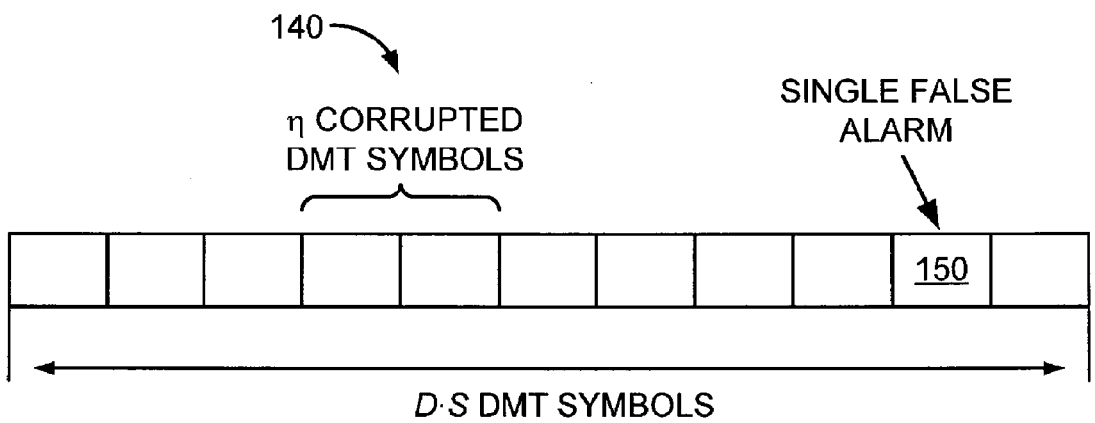
FIG. 1C illustrates the impact of a single false alarm in the system model depicted in FIG. 1A.

Reference is now made to FIGS. 1A-1C. FIG. 1A is a system model for illustrating the impact of false alarms and miss events that occur at the output of an impulse noise detector. FIG. 1B illustrates the impact of a single miss event, and FIG. 1C illustrates the impact of a single false alarm. The variable D denotes the number of RS codewords per RS-interleaved frame, 1/S denotes the number of RS codewords per DMT symbol, and η refers to the impulse noise protection level—that is, the maximum number of impulse noise corrupted DMT symbols that can be corrected per RS-interleaved frame consisting of D·S DMT symbols. In addition, T=$d_{min}$−1 denotes the number of redundant symbols in a RS codeword. The value T also represents the maximum number of erased symbols that can be corrected in a RS codeword.

A scenario is considered where exactly η DMT symbols in a RS-interleaved frame spanning D·S DMT symbols are corrupted by impulse noise. This represents the worst-case scenario in which to study the impact of an erroneous detection since the error-erasure correction capability of the RS code is fully utilized. Any additional erasures or errors will prevent the RS decoder from successfully decoding to the transmitted codeword. Further, based on commonly used decoder implementations, it is also assumed that when the error-erasure correction capability of the RS code is exceeded, the RS decoder signals a decoder failure and simply copies the input to the output. It should be noted that although FIG. 1A shows the η impulse-noise corrupted DMT symbols as being contiguous, they may also be randomly scattered over the RS-interleaved frame. It is further assumed that there are no RS codeword symbol errors on the (DS−η) non-impulse-noise-corrupted DMT symbols. Such an assumption is reasonable to make given the 6 dB noise margin that exists in a "nominal noise" environment.

Impact of Misses

The impact of miss events is now described. In particular, the degradation in BER performance at the output of the RS decoder under each of the two impulse-noise detection error events (i.e., the miss event alarm and the false alarm) is examined. With reference to FIG. 1B, suppose that exactly one of the η impulse-noise corrupted DMT symbols in the RS-interleaved frame is misdetected—that is, the symbol is flagged as a nominal noise DMT symbol. Additional miss events in the η impulse-noise corrupted DMT symbols of the RS-interleaved frame can be safely ignored since the probability-of-miss ($P_M$) at which the system is expected to operate is very small. Similarly, it is also assumed that no false alarm event simultaneously occurs on the (Ds−η) nominal-noise corrupted DMT symbols. This assumption is also reasonable since the probability-of-false-alarm ($P_{FA}$) at which the system is expected to operate is very small. Thus, the simultaneous occurrence of a miss and false alarm in a RS-interleaved frame can be safely ignored. Based on these underlying assumptions, the probability-of-miss in a RS-interleaved frame can be computed as:

$$\pi_M(\eta) = \eta \cdot P_M \cdot (1-P_M)^{\eta-1} \cdot (1-P_{FA})^{(DS-\eta)} \approx \eta P_M \quad \text{Equation 12}$$

where the last approximation follows since η and DS are not very large.

It should thus be emphasized that when such a miss event occurs in the RS-interleaved frame, the number of errors at the input to the RS decoder (due to the RS code symbols of the misdetected impulse noise corrupted DMT symbol not being flagged as erasures) and the number of erasures (arising from the correctly detected impulse noise corrupted DMT symbols) will exceed the error-erasure correction capability of the RS code. As a result, the RS decoder will copy its input to its output. Consequently, for the entire RS-interleaved frame containing a miss event, the worst-case bit-error-rate at the output of the RS decoder will be equal to the ratio of the actual number of impulse noise corrupted DMT symbols to the total number of DMT symbols as given by the equation below:

$$P_b(err \mid \text{miss}) = \frac{\eta}{DS} = \frac{T}{N} \quad \text{Equation 13}$$

Finally, if a worst-case scenario is assumed where every RS-interleaved frame contains exactly η DMT symbols corrupted by impulse noise (which is a possibility in the case of repetitive electrical impulse noise), the average bit-error rate can be computed from the two prior equations as:

$$p_{b,\text{miss}} = \pi_M(\eta) \cdot P_b(err \mid \text{miss}) \approx P_M \eta \frac{T}{N} \quad \text{Equation 14}$$

Impact of False Alarms

Similar to the analysis set forth above for miss events, FIG. 1C depicts a scenario where exactly one of the nominal-noise corrupted DMT symbols in the RS-interleaved frame is misdetected (i.e., incorrectly flagged as an impulse noise DMT symbol). Additional false alarm events in the impulse noise corrupted DMT symbols of the RS-interleaved frame are ignored. Again, the possibility of a miss event simultaneously occurring with the impulse noise corrupted DMT symbols can be safely ignored. Accordingly, the probability of a false alarm in a RS-interleaved frame can be computed as follows:

$$\pi_{FA}(\eta,DS)=(DS-\eta) \cdot P_{FA} \cdot (1-P_{FA})^{(DS-\eta-1)} \cdot (1-P_M)^{\eta} \approx (DS-\eta)P_{FA} \quad \text{Equation 15}$$

Again, as with misses, it should be emphasized that when false alarms occur in a RS-interleaved frame, the number of erasures at the input to the RS decoder (due to the RS code symbols of the misdetected nominal-noise corrupted DMT symbol as well as correctly detected impulse noise corrupted DMT symbols being flagged as erasures) will exceed the error-erasure correction capability of the RS code. Accordingly, the RS decoder will copy its input to its output. Again, as in the case of a miss event, the worst-case bit-error-rate at the output of the RS decoder for the entire RS-interleaved frame containing a false alarm event will equal the ratio of the actual number of IN-corrupted DMT symbols to the total number of DMT symbols. Thus, the following holds true:

$$P_b(err \mid \text{false alarm}) = \frac{\eta}{DS} = \frac{T}{N} = P_b(err \mid \text{miss}) \quad \text{Equation 16}$$

Finally, if a worst-case scenario is assumed where every RS-interleaved frame contains exactly η DMT symbols corrupted by impulse noise, the average bit-error rate can be computed from Equations 15 and 16 as follows:

$$p_{b,\text{false alarm}} = \pi_{FA}(\eta, DS) \cdot P_b(err \mid \text{false alarm}) \approx P_{FA}(DS-\eta)\frac{T}{N} \quad \text{Equation 17}$$

Having discussed the impact of misses and false alarms on the average BER, exemplary methods are now described for deriving parameters for an impulse noise detector whereby the overall average BER performance meets design requirements.

Optimization of Frequency Domain Impulse Noise Detectors

Exemplary methods for deriving design parameters associated with impulse noise detectors are now described to meet such diverse requirements as BER performance and minimal complexity of the detector. According to the G.993.2, VDSL2 Standard, the design BER requirement at the output of an RS decoder for DMT-DSL systems offering such services as ADSL and VDSL is $10^{-7}$. It should be noted, however, that even more stringent BER performance is required for such advanced services as video. As such, exemplary embodiments are described below for adjusting parameters of impulse noise parameters so that misdetections at the output of the impulse noise detector have a significantly small probability of occurrence such that the average BER of the RS decoder is not degraded to the point where the BER fails to meet industry requirements.

The relationships derived earlier between the average BER and miss and false alarm probabilities are now used to derive minimum requirements on the impulse noise detector performance described by $P_M$ and $P_{FA}$. Specifically, from Equation 14 and realistic values (values commonly seen in the industry) of $\eta$, the probability of bit error is at the most two orders of magnitude higher than the value of $P_M$, since the largest theoretical value for $$\frac{T}{N}$$

is unity. From Equation 17 and realistic values of D, S, and $\eta$, a similar relationship can also be established between the probability of bit-error and $P_{FA}$. Based on these relationships, the following holds true—in the presence of an impulse noise detector, the BER performance of the system will meet BER industry requirements (i.e., design BER) as long as the values of both $P_M$ and $P_{FA}$ are more than two orders of magnitude below the design BER. In particular, for a design BER of $10^{-7}$, the following probability values are desired: $P_{FA}<10^{-9}$ and $P_M<10^{-9}$. As such, exemplary methods seek to adjust these probability values accordingly.

It should be noted, however, that these constraints on the values of $P_M$ and $P_{FA}$ cannot be adjusted in isolation. These probability values are also adjusted in conjunction with other xDSL transceiver features, such as maintaining a noise margin of 6 dB in addition to supporting seamless rate adaptation (SRA) mechanisms, as known by those skilled in the art. In particular, as long as $\beta$, the ratio of the standard deviation in the "disruptive noise" environment to that in the "nominal noise" environment, is below the noise margin and the SRA trigger threshold, the impulse noise detector should be set to experience a high probability of flagging the DMT symbol as a "nominal" symbol. This is motivated by the fact that (1) SRA mechanisms for addressing changes in the nominal noise environment should not be compromised; and (2) the tolerances incorporated into the system ensures that RS decoding with erasure correction does not have to be relied upon to achieve industry requirements for BER performance when the impulse noise is weak (i.e., when $\beta$<the noise margin).

Conversely, as soon as the value for $\beta$ becomes large enough to cause deterioration in BER performance when incorporating RS decoding without erasure corrections, parameters associated with the impulse noise detector are adjusted such that the detector has a high probability of flagging the DMT symbol as being corrupted by impulse noise. It should be noted that this then allows the benefits of RS decoding with erasures to be realized. In this regard, exemplary embodiments for adjusting parameters associated with the detector are defined by a step function pivoted about a value of $\beta$ close to but below the noise margin. For purposes of nomenclature, this pivot value is denoted as $\beta_{pivot}$. In particular, the parameter $\beta_{pivot}$ represents a selected value of the ratio of the standard deviation of disruptive noise to the standard deviation of nominal noise at which an ideal impulse noise detector transitions from flagging a DMT symbol as corrupted by nominal noise to flagging a DMT symbol as corrupted by disruptive noise. As such, optimally tuned impulse noise detectors flag any DMT symbol as a "nominal" DMT symbol (refer back to Hypothesis $\mathcal{H}_0$ described earlier) when $\beta<\beta_{pivot}$. On the other hand, if a DMT symbol has $\beta \geq \beta_{pivot}$, then the impulse noise detector is adjusted to flag the DMT symbol as an "impulse noise corrupted" DMT symbol (refer back to Hypothesis $\mathcal{H}_1$).

Figure 2:
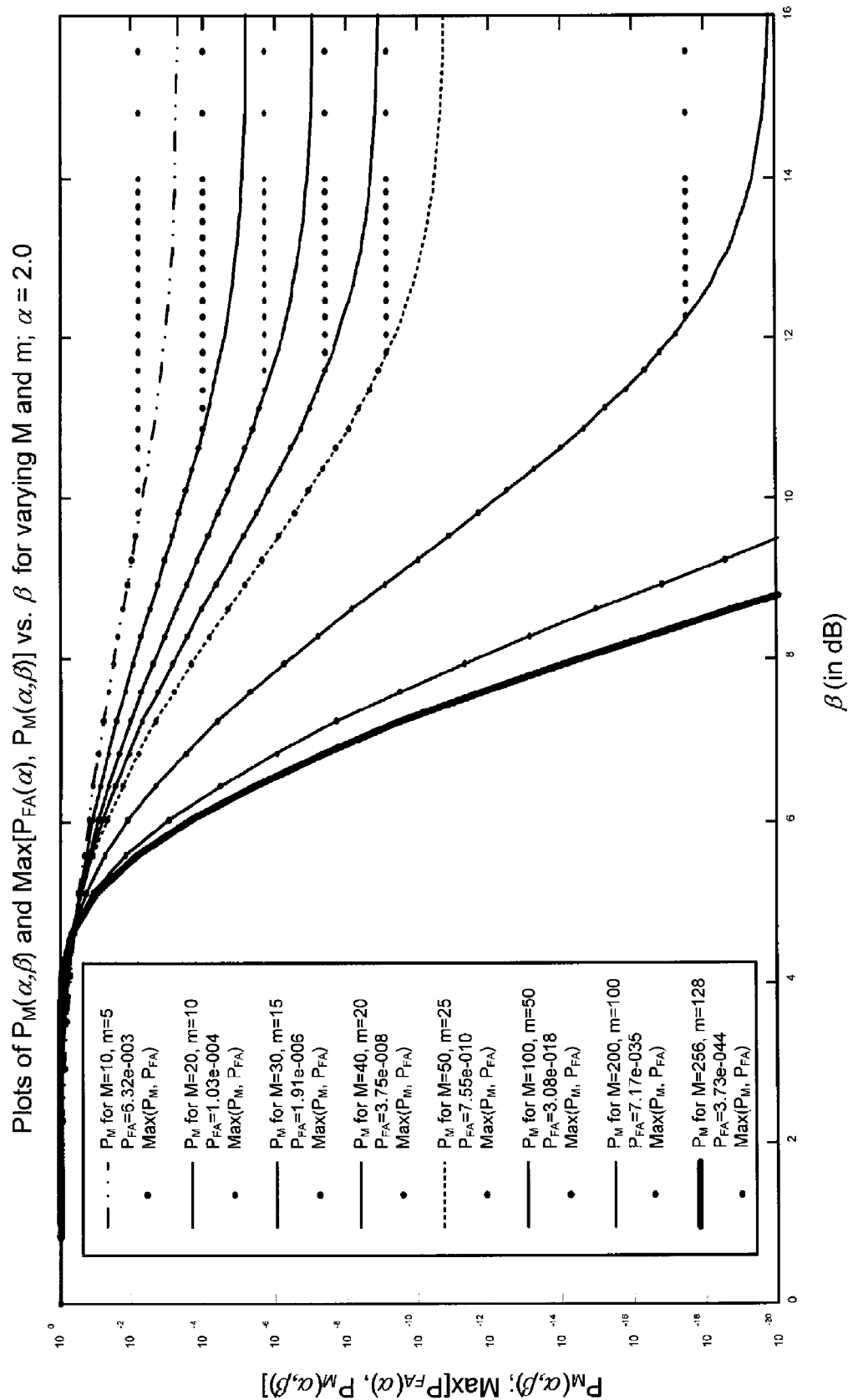
FIG. 2 depicts curves for $P_M(\alpha,\beta)$ and $\max(P_{FA}(\alpha), P_M(\alpha, \beta))$ for a frequency domain impulse noise detector as a function of β for different M and m where α=2.0.

FIG. 2 depicts plots of $P_M(\alpha,\beta)$ and $\max(P_{FA}(\alpha),P_M(\alpha,\beta))$ for a frequency domain impulse noise detector as a function of $\beta$ in dB for different M and m where $\alpha=2.0$. The plots of $P_M(\alpha,\beta)$ are depicted by the lines or dashed lines, while the plots for $\max(P_{FA}(\alpha),P_M(\alpha,\beta))$ are depicted by the dotted curves. A nominal value of $\sigma_k=0.2$ and a large constellation grid are assumed. It should be noted that the value of $P_{FA}$ (the probability of a false alarm occurring) corresponding to each $P_M(\alpha,\beta)$ curve is completely determined by $\alpha$, M, and m. Finally, the dotted curves in FIG. 2 reflect the maximum values for $P_M(\alpha,\beta)$ and the corresponding $P_{FA}$ for every $\beta$. From FIG. 2, it should be noted that all the $P_M(\alpha,\beta)$ curves appear to intersect at a specific value of $\beta$ where $P_M(\alpha,\beta)\approx 0.5$. In fact, since the value for m is selected such that m=M/2 for all the curves, it can be easily shown using basic combinatorics that this value of $\beta$ satisfies the following relationship:

$$e^{-\alpha^2/2\beta^2} = 0.5, \quad \quad \text{Equation 18}$$

or $$\beta^2 = \frac{\alpha^2}{\ln(4)}$$

which corresponds to $\beta=1.698$ (4.6 dB) for $\alpha=2$. In accordance with exemplary embodiments for adjusting parameters, it should be noted that the value of $\beta$ in Equation 18 is set equal to the pivot quantity $\beta_{pivot}$ previously discussed. In this regard, Equation 18 above provides a powerful design tool determining the value of $\alpha$ from the desired value of $\beta_{pivot}$. While the ratio of m to M in FIG. 2 is 0.5, it should be emphasized that the ratio of these parameters are not limited to this value and that other ratios may be incorporated as well. Generally, for a fixed ratio m/M, the following holds true:

$$\lim_{M\to\infty} (q \exists (P_M(\alpha,\beta)=0.5)) = \frac{m}{M} \quad \quad \text{Equation 19}$$

Thus, for small values of $\beta$, this equivalently translates to the following:

$$q \approx e^{-\alpha^2/2\beta^2} = \frac{m}{M}, \quad \quad \text{Equation 20}$$

or $$\beta^2 = \frac{-\alpha^2}{2}\ln\left(\frac{m}{M}\right)$$

As a non-limiting example, for $\alpha=2$ and $$\frac{m}{M} = 0.5,$$

Equation 20 yields $\beta=1.698$ (4.6 dB). It should be noted that the value of $\beta$ which satisfies Equation 20 can, in fact, be equated to the quantity $\beta_{pivot}$ that was previously introduced in the context of the IN detector. Thus, Equation 20 provides a powerful design tool to determine the value of $\alpha$ from the desired value of $\beta_{pivot}$.

Figure 3:
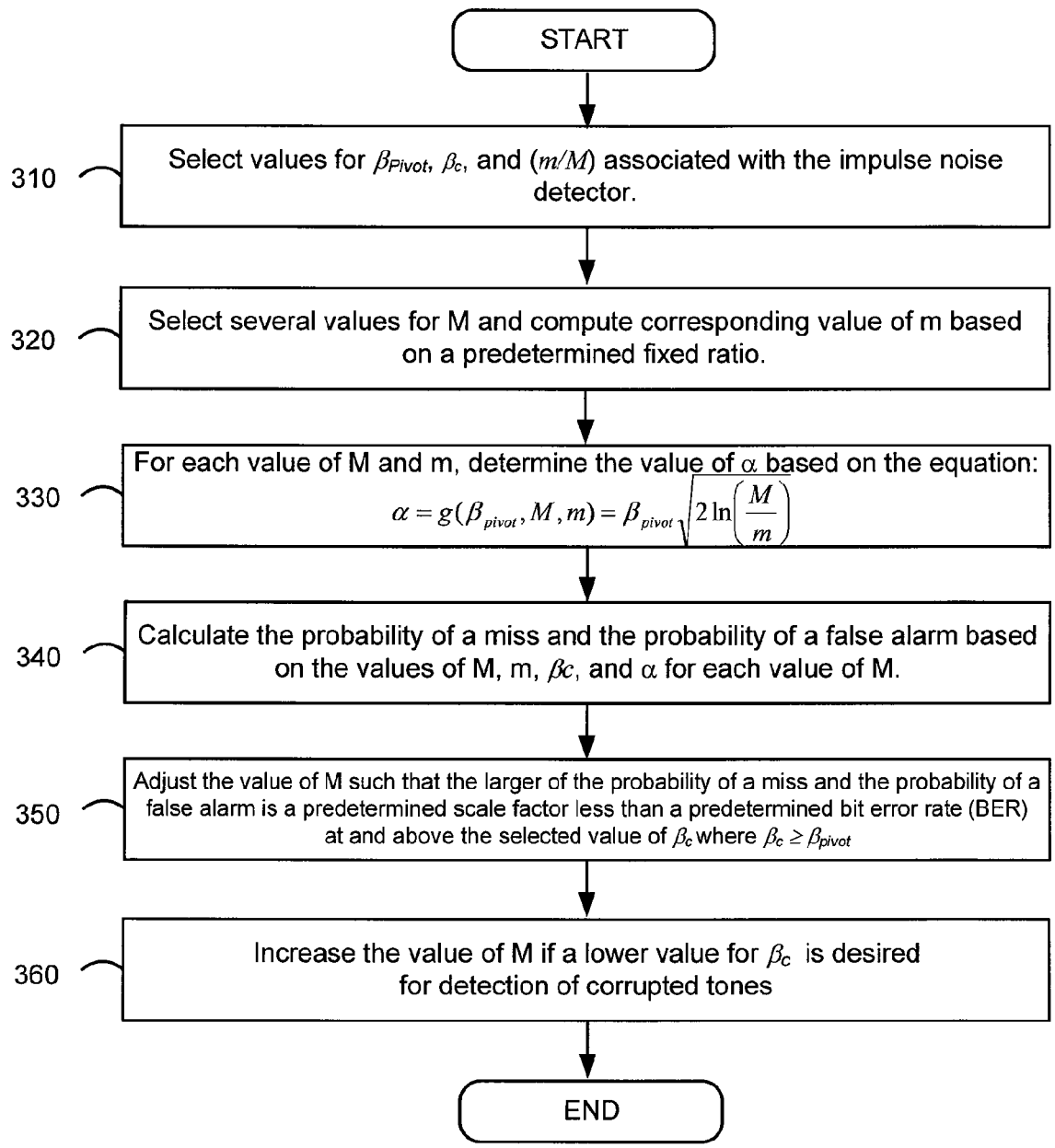
FIG. 3 depicts an embodiment for deriving parameters to enhance performance of a frequency domain impulse noise detector.

Exemplary processes for designing the parameters of a class of frequency domain impulse noise detectors that monitors M tones and has a fixed ratio for (m/M) are now discussed. Reference is made to FIG. 3. Step 310 begins by selecting values for $\beta_{pivot}$, $\beta_c$, and the ratio m/M. As a non-limiting example, a fixed ratio (m/M)=0.5 may be used. Several values of M are chosen and m is correspondingly determined based on the predetermined ratio (m/M) (step 320). For each value of M and the desired value for $\beta_{pivot}$, the value of $\alpha_{pivot}$ can then be derived according to the following equation (step 330):

$$\alpha_{pivot} = \beta_{pivot} \sqrt{2\ln\left(\frac{M}{m}\right)} \qquad \text{Equation 21}$$

Once the value for $\alpha_{pivot}$ is determined, step 340 proceeds by calculating the probability values for $P_{FA}(\alpha_{pivot})$ and $P_M(\alpha_{pivot}, \beta_c)$ based on the values of M, m, $\beta_c$, and $\alpha_{pivot}$ for each selected value of M. In step 350, the smallest value for M (the number of monitored tones) from the chosen values such that the result from max $(P_{FA}(\alpha_{pivot}), P_M(\alpha_{pivot}, \beta_c))$ is less than or equal to $p_{b,design}/\xi$ for some $\beta_c \geq \beta_{pivot}$ pivot is selected, where $p_{b,design}$ represents the design BER (e.g., industry requirement for BER) of the system and $\xi$ is a factor that relates $p_{b,design}$ to the probability of occurrence of miss and false alarm events. From Equation 14 and Equation 17, the parameter $\xi$ is defined as:

$$\xi = \max_{\eta,DS,T,N} \left(\eta\frac{T}{N}, (DS-\eta)\frac{T}{N}\right) \qquad \text{Equation 22}$$

In other words, the value for M is selected such that the larger value between $P_{FA}(\alpha_{pivot})$ and $P_M(\alpha_{pivot}, \beta_c)$ is less than a predetermined design BER (e.g., $10^{-7}$) by an additional factor defined by $\xi$. In accordance with some embodiments, the value for M can be increased if it is desired that max $(P_{FA}(\alpha_{pivot}), P_M(\alpha_{pivot}, \beta_c))$ achieves the value of $p_{b,design}/\xi$ at a smaller value of $\beta_c$ (step 360).

Figure 4:
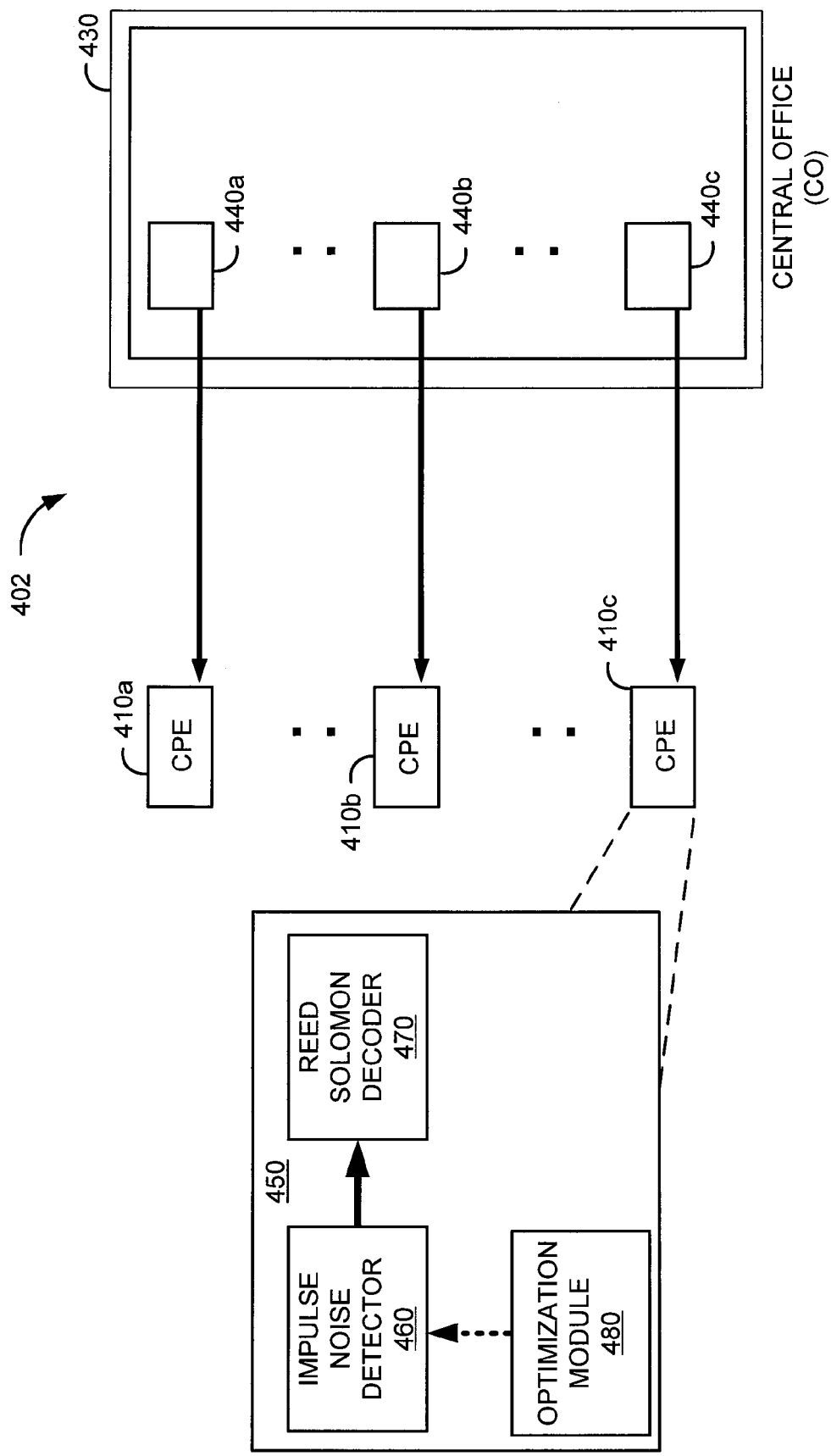
FIG. 4 illustrates an xDSL system in which embodiments such as the embodiment depicted in FIG. 3 are applied for deriving parameters to enhance performance of a frequency domain impulse noise detector.

Reference is made to FIG. 4, which illustrates an xDSL system 402 in which embodiments for deriving parameters to optimally tune a frequency domain impulse noise detector are applied. In the non-limiting DMT based xDSL system 402 (FIG. 1), multiple sets of end users or customer premises equipment (CPE) 410a, 410b, 410c are shown connected to a central office (CO) 430. The CO 430 may include an xDSL Access Multiplexer (DSLAM), xDSL line cards 440a, 440b, 440c, and other equipment for interfacing with CPE 410a, 410b, 410c. In accordance with exemplary embodiments, the methods for deriving parameters for impulse noise detectors may be incorporated in the CPE 410a, 410b, 410c, which may include a receiver module 450. It should be noted, however, that the exemplary methods can also be incorporated on the CO 430 side as well.

The receiver module 450 comprises an impulse noise detector 460 which monitors the instantaneous error at the output of the QAM constellation demapper over a range of tones (sub-carriers). Based on a target BER of the communication system (such as that required under the G.993.2 VDSL2 Standard), the minimum expected performance of impulse noise detection can be derived. Furthermore, transceiver features such as noise margin performance and SRA mechanisms are taken into consideration to optimally adjust parameters for an impulse noise detector.

Receiver 450 further comprises an optimization module 480 for tuning parameters associated with the impulse noise detector 460 in accordance with the exemplary methods described herein. The impulse noise detector 460 is adjusted to work optimally in conjunction with the Reed Solomon (RS) decoder 470 where erasures are accurately flagged to improve the performance of the RS decoder. In particular, the detector settings are tuned so that the system BER performance meets design requirements for a range of impulse noise conditions. The dotted line between the impulse noise detector 460 and the optimization module 480 is used to denote a control path, and the solid line shown between impulse noise detector 460 and the RS decoder 470 is used to denote a data path.

Figure 5:
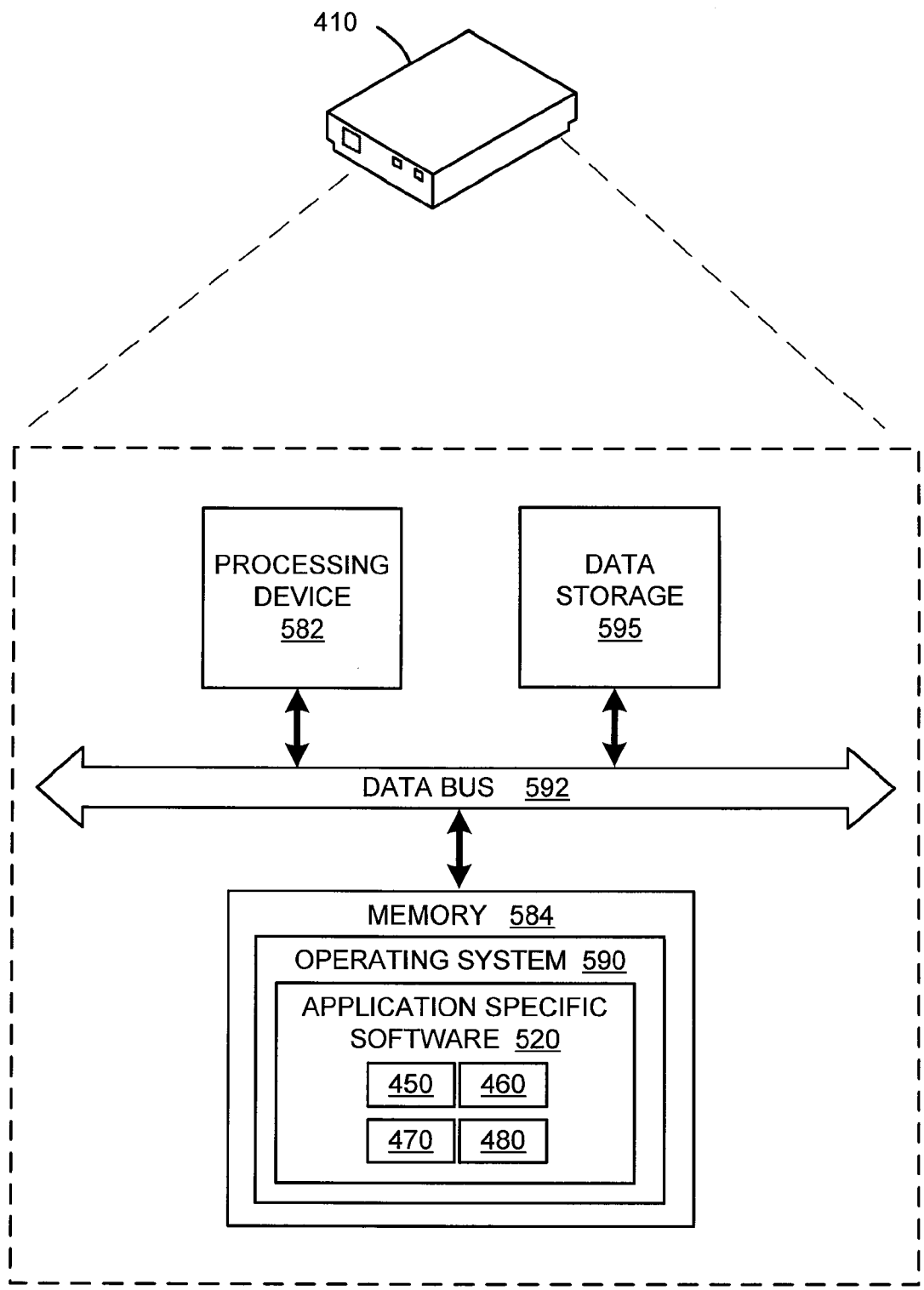
FIG. 5 is a schematic diagram of an embodiment of one of the end users depicted in FIG. 4.

Reference is now made to FIG. 5, which is a schematic diagram of an embodiment of one of the end users depicted in FIG. 4. In accordance with certain embodiments, the steps for performing optimization of the impulse noise detector may be incorporated in software within an end user such as a DSL modem. One of ordinary skill in the art will appreciate that DSL modems comprise other components, which have been omitted for purposes of brevity. Generally, the DSL modem 410 may include a processor 582, a memory component 584 (which may include volatile and/or nonvolatile memory components), and a data storage component 595 that are communicatively coupled via a local interface 592.

The local interface 592 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 582 may be a device for executing software, particularly software stored in the memory component 584. The processor 582 can be any custom made or commercially available processor, a central processing unit (CPU), an auxiliary processor among several processors associated with the DSL modem 410, a semiconductor based microprocessor (in the form of a microchip or chip set), a macroprocessor, or generally any device for executing software instructions.

The memory component 584 can include any one or combination of volatile memory elements (e.g., random access memory (RAM, such as DRAM, SRAM, SDRAM, etc.)) and/or nonvolatile memory elements (e.g., ROM, hard drive, tape, CDROM, etc.). Moreover, the memory component 584 may incorporate electronic, magnetic, optical, and/or other types of storage media. One should note that some embodiments of the memory component 584 can have a distributed architecture (where various components are situated remotely from one another), but can be accessed by the processor 582.

The software in memory component 584 may include one or more separate programs, each of which includes an ordered listing of executable instructions for implementing logical functions. In the example shown in FIG. 5, the software in the memory component 584 may include an operating system 590. Furthermore, the software residing in memory 584 may include application specific software 520, which may further comprise the following: a receiver module 450, impulse noise detector 460, RS decoder 470, and an optimization module 480. It should be noted, however, that these modules can be implemented in software, hardware or a combination of software and hardware. The operating system 590 may be configured to control the execution of other computer programs and provides scheduling, input-output control, file and data management, memory management, and communication control and related services.

A system component and/or module embodied as software may also be constructed as a source program, executable program (object code), script, or any other entity comprising a set of instructions to be performed. When constructed as a source program, the program is translated via a compiler, assembler, interpreter, or the like, which may or may not be included within the memory component 584, so as to operate properly in connection with the operating system 590. When the DSL modem 410 is in operation, the processor 582 may be configured to execute software stored within the memory component 584, communicate data to and from the memory component 584, and generally control operations of the DSL modem 410 pursuant to the software. Software in memory may be read by the processor 582, buffered within the processor 582, and then executed.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method comprising:
setting, by a processor, values for $\beta_{pivot}$, $\beta_c$, and a ratio (m/M), wherein M is a number of monitored tones, m is a number of slicer error samples that must exceed a decision threshold for a symbol to be flagged as corrupted, and $\beta_{pivot}$ and $\beta_c$ are values associated with a monotonic function of a ratio of a statistical parameter of disruptive noise to a statistical parameter of nominal noise;
selecting a plurality of values for M and computing a corresponding value of m based on the ratio (m/M);
calculating α based on the values of M, m, and $\beta_{pivot}$, wherein α is a tunable scaling factor;
calculating a probability of a miss and a probability of a false alarm based on the values of M, m, $\beta_c$, and α for each value of M; and
adjusting the value of M such that the larger of the probability of a miss and the probability of a false alarm is a predetermined scale factor less than a predetermined bit error rate (BER) at a selected value of $\beta_c$ in order to achieve the predetermined BER.

2. The method of claim 1, wherein setting the pivot value $\beta_{pivot}$ comprises setting $\beta_{pivot}$ to a value within a predetermined range of a noise margin associated with transmission of a tone.

3. The method of claim 1, wherein the predetermined BER threshold is $10^{-7}$.

4. The method of claim 1, wherein the predetermined scale factor is $10^{-2}$.

5. The method of claim 1, wherein adjusting the value of M comprises increasing or decreasing the number of monitored tones M and the value of m according to the ratio (m/M) such that a different value for $\beta_c$ can be incorporated for detection of corrupted symbols.

6. The method of claim 1, wherein the statistical parameter is standard deviation and wherein the monotonic function is the identity function.

7. The method of claim 1, wherein calculating α is based on the equation $\beta=g(\beta_{pivot}, M, m)$ where $g(\ )$ denotes a function of $\beta_{pivot}$, M, and m.

8. The method of claim 7, wherein $$g(\beta_{pivot}, M, m) = \beta_{pivot}\sqrt{2\ln\left(\frac{M}{m}\right)}.$$

9. A system comprising:
a frequency domain impulse noise detector configured to monitor received discrete multi-tone (DMT) symbols for impulse noise;
a Reed Solomon (RS) decoder with erasure and erasure correction capability for performing error correction on received DMT symbols; and
an optimization module configured to adjust parameters associated with the impulse noise detector, the optimization module configured to adjust values for $\beta_{pivot}$, $\beta_c$, and a ratio (m/M), wherein M is a number of monitored tones, m is a number of slicer error samples that must exceed a decision threshold for a symbol to be flagged as corrupted, and $\beta_{pivot}$ and $\beta_c$ are values associated with a monotonic function of a ratio of a statistical parameter of disruptive noise to a statistical parameter of nominal noise.

10. The system of claim 9, wherein the optimization module is further configured to adjust the pivot value $\beta_{pivot}$ to a value within a predetermined range of a noise margin associated with transmission of a tone.

11. The system of claim 9, wherein the system comprises an xDSL modem.

12. The system of claim 9, wherein the statistical parameter is standard deviation and wherein the monotonic function is the identity function.

13. The system of claim 9, wherein the optimization module is further configured to select a plurality of values for M and compute a corresponding value of m based on the ratio (m/M); calculate a based on the equation $\alpha=g(\beta_{pivot}, M, m)$, where $g(\ )$ denotes a function of $\beta_{pivot}$, M, and m, wherein α is a tunable scaling factor; and calculate a probability of a miss and a probability of a false alarm based on the values of M, m, $\beta_c$, and α for each value of M.

14. The system of claim 13, wherein $$g(\beta_{pivot}, M, m) = \beta_{pivot}\sqrt{2\ln\left(\frac{M}{m}\right)}.$$

15. The system of claim 9, wherein the optimization module is further configured to adjust the value of M such that the larger of the probability of a miss and the probability of a false alarm is a predetermined scale factor less than a predetermined bit error rate (BER) at a selected value of $\beta_c$ in order to achieve the predetermined BER.

16. The system of claim 15, wherein the predetermined ER is $10^{-7}$.

17. The system of claim 15, wherein the predetermined scale factor is $10^{-2}$.

18. A method comprising:
   setting, by a processor, values for $\beta_{pivot}$ and $\beta_c$, wherein $\beta_{pivot}$ and $\beta_c$ are values associated with a monotonic function of a ratio of a statistical parameter of disruptive noise to a statistical parameter of nominal noise;
   selecting a fixed ratio (m/M), wherein M is a number of monitored tones and wherein m is a number of slicer error samples that must exceed a decision threshold for a symbol to be flagged as corrupted;
   selecting a plurality of values for M and computing a corresponding value of m based on the fixed ratio (m/M);
   calculating α based on the values of M, m, and $\beta_{pivot}$, wherein α is a tunable scaling factor; and
   calculating a probability of a miss and a probability of a false alarm based on the values of M, m, $\beta_c$, and α for each of the plurality of values of M.

19. The method of claim 18, further comprising selecting from among the plurality of values for M such that the larger of the probability of a miss and the probability of a false alarm is a predetermined scale factor less than a predetermined bit error rate (BER) at a selected value of $\beta_c$ in order to achieve the predetermined BER.

20. The method of claim 18, wherein calculating α comprises calculating α based on the equation α=g($\beta_{pivot}$, M, m) wherein $$g(\beta_{pivot}, M, m) = \beta_{pivot}\sqrt{2\ln\left(\frac{M}{m}\right)}.$$

21. The method of claim 18, wherein the predetermined BER is $10^{-7}$.

22. The method of claim 18, wherein the predetermined scale factor is $10^{-2}$.

23. The method of claim 18, further comprising increasing or decreasing the number of monitored tones M and the value of m according to the fixed ratio (m/M) such that a different value for $\beta_c$ can be incorporated for detection of corrupted tones.

24. The method of claim 18, wherein adjusting a decision threshold comprises selecting a pivot value $\beta_{pivot}$ such that the value of $\beta_{pivot}$ is within a predetermined range of a noise margin associated with transmission of a tone.

25. The method of claim 18, wherein the statistical parameter is standard deviation and wherein the monotonic function is the identity function.

26. A system comprising:
   means for monitoring received discrete multi-tone (DMT) symbols for impulse noise;
   means for performing error correction on received DMT symbols; and
   means for adjusting parameters associated with the impulse noise detector, the adjusting means further configured to adjust values for $\beta_{pivot}$, $\beta_c$, and a ratio (m/M), wherein M is a number of monitored tones, m is a number of slicer error samples that must exceed a decision threshold for a symbol to be flagged as corrupted, and $\beta_{pivot}$ and $\beta_c$ are values associated with a monotonic function of a ratio of a statistical parameter of disruptive noise to a statistical parameter of nominal noise.

27. The system of claim 26, wherein the means for adjusting is further configured to adjust the pivot value $\beta_{pivot}$ to a value within a predetermined range of a noise margin associated with transmission of a tone.

28. The system of claim 26, wherein the xDSL communications system comprises an xDSL modem.

29. The system of claim 26, wherein the statistical parameter is standard deviation and wherein the monotonic function is the identity function.

30. The system of claim 26, wherein the means for adjusting is further configured to select a plurality of values for M and compute a corresponding value of m based on the ratio (m/M); calculate α based on the equation α=g($\beta_{pivot}$, M, m) where g( ) denotes a function of $\beta_{pivot}$, M, and m, wherein α is a tunable scaling factor; and calculate a probability of a miss and a probability of a false alarm based on the values of M, m, $\beta_c$, and α for each value of M.

31. The system of claim 30, wherein $$g(\beta_{pivot}, M, m) = \beta_{pivot}\sqrt{2\ln\left(\frac{M}{m}\right)}.$$

32. The system of claim 26, wherein the means for adjusting is further configured to adjust the value of M such that the larger of the probability of a miss and the probability of a false alarm is a predetermined scale factor less than a predetermined bit error rate (BER) at a selected value of $\beta_c$ in order to achieve the predetermined BER.

33. The system of claim 32, wherein the predetermined BER is $10^{-7}$.

34. The system of claim 32, wherein the predetermined scale factor is $10^{-2}$.

* * * * *